United States Patent [19]
Fujihara et al.

[11] Patent Number: 5,176,571
[45] Date of Patent: Jan. 5, 1993

[54] WIND DEFLECTING PLATE FOR AIR CONDITIONING GRILLES

[75] Inventors: Kazuo Fujihara; Hidenori Ueda; Kazuhiro Taguchi, all of Nishikasugai, Japan

[73] Assignee: Toyoda Gosei Co., Ltd., Nishikasugai, Japan

[21] Appl. No.: 690,778

[22] Filed: Apr. 26, 1991

[30] Foreign Application Priority Data

Apr. 28, 1990 [JP] Japan .................................. 2-113083
Apr. 28, 1990 [JP] Japan .................................. 2-113084

[51] Int. Cl.⁵ ............................................. F24F 13/15
[52] U.S. Cl. ..................................... 454/320; 454/285
[58] Field of Search ............... 454/153, 155, 285, 320; 415/208.1

[56] References Cited

U.S. PATENT DOCUMENTS

| | | | |
|---|---|---|---|
| 4,905,580 | 3/1990 | Komori et al. | 454/155 |
| 4,957,036 | 9/1990 | Fjuihara et al. | 454/155 |
| 5,056,420 | 10/1991 | Komori et al. | 454/155 |

FOREIGN PATENT DOCUMENTS

| | | | |
|---|---|---|---|
| 123251 | 6/1987 | Japan | 454/285 |
| 261852 | 11/1987 | Japan | 454/313 |
| 54549 | 3/1988 | Japan | 454/258 |

Primary Examiner—Harold Joyce
Attorney, Agent, or Firm—Cushman, Darby & Cushman

[57] ABSTRACT

Wind deflecting plates of an air conditioning grille include flexible plates are made of a thermoplastic material, so that they may bend to smoothly change the direction of wind when the deflecting plates are swung, and front and rear supports for the flexible plates. The material for the front and rear supports is of the same type as the material for the flexible plate and has a melting point close to that of the flexible plate but a hardness and stiffness different from the material of the flexible plate. The supports support the associated flexible plate at the windward and leeward ends thereof, respectively, and urge the flexible plate when bent to return to the flat state. At the end surface facing a blower rotor, the rear support has an arc portion having a shape corresponding to the outer surface of the rotor.

13 Claims, 5 Drawing Sheets 5,176,571

WIND DEFLECTING PLATE FOR AIR CONDITIONING GRILLES

BACKGROUND OF THE INVENTION

1. Field of the Invention

The present invention relates to wind deflecting plates for a grille used in an air conditioning system. More particularly, this invention pertains to wind deflecting plates which adjust the air blowing direction.

2. Description of the Related Art

A conventional air conditioning grille, which is installed on an instrument panel in a vehicle to control the air blowing direction, is disclosed in, for example, Published Unexamined Japanese Utility Model Application No. Hei 1-66545. This grille has a plurality of wind deflecting plates provided between a pair of upper and lower base plates and extending laterally leeward of an air conditioner or the like. These wind deflecting plates are joined by a linking rod on the air conditioner side, so that all the wind deflecting plates simultaneously swing in one direction to control the direction of the wind.

Each wind deflecting plate comprises a flexible plate made of a soft material and a pair of end supports made of a hard material respectively provided windward and leeward of the flexible plate. Swinging the wind deflecting plates will bend the flexible plates to smoothly alter the wind direction.

According to this type of air conditioning grille, since the grille is spaced a relatively large distance from the blower rotor of the air conditioner, the shape and size of the end supports of each wind deflecting plate are not restricted by the blower rotor, resulting in very large freedom of design.

If this grille is applied to an air conditioner which is attached to a wall in a house, however, the grille will be attached to the vicinity of the front side of the blower rotor. This greatly restricts the shape and size of the windward supports of the wind deflecting plates.

It is desirable that the flexible plates be formed large in order to smoothly change the wind direction. With enlarged flexible plates, however, the end supports should inevitably be made smaller due to the restriction on the entire size of the wind deflecting plates. The supports therefore have insufficient mechanical strength, making it difficult to hold the bent flexible plates and possibly causing malfunction thereof. It is thus troublesome to maintain the air conditioning grille.

In addition, if the fore and aft length of the supports is short, noise may be generated when the wind flows through the grille, impairing the environment where the air conditioner is used.

The end supports and the flexible plate, which constitute each wind deflecting plate, are securely joined together by means of an adhesive. Another way to connect the supports and the flexible plate is to form the supports of a rod member with a high rigidity and embed the supports in the flexible plate. As a further method to couple the supports and the flexible plate, each support may be formed of a tubular member so that the flexible plate can partially be fitted in the tubular member.

These conventional structures to join the supports and flexible plate, however, have the following shortcomings. When an adhesive is used to securely join the supports and flexible plate, the required bond strength can be expected to a degree, but the necessity of using the adhesive and an additional coating process will inevitably increase the manufacturing cost.

Mechanical couplings that involve embedding a rod member in the flexible plate, fitting part of the flexible plate in a rod member, or joining the supports and flexible plate by means of, for example, mating engagement of recesses and projections, are not capable of providing a sufficient bond strength. Repetitive alteration of the bent direction of the wind deflecting plates over a long period of time will break off or peel off the joint portions.

SUMMARY OF THE INVENTION

It is therefore an object of the present invention to provide wind deflecting plates for an air conditioning grille, which are designed to permit secure coupling of the end supports and flexible plate without applying an adhesive, thus resulting in low manufacturing cost.

It is another object of the present invention to provide wind deflecting plates of an air conditioning grille, which have excellent durability so that even extended usage will not cause the joint portions to sever or peel off between the supports and flexible plate.

It is a further object of the present invention to provide wind deflecting plates for an air conditioning grille, which are easy to maintain.

It is a still further object of the present invention to provide wind deflecting plates for an air conditioning grille, which can ensure a good environment where they are used.

To accomplish the foregoing and other objects in accordance with the invention, a wind deflecting plate for a grille, which is swingably mounted at a downstream side of a cylindrical rotor to change the blowing direction of the wind generated by the rotor, includes a flexible plate that is curved to smoothly change the blowing direction of the wind when swung. The flexible plate is formed from a first thermoplastic material. A front rigid support secures the downstream end of the flexible plate while a rear rigid support secures the upstream end. The rear support has an arcuate portion formed in a shape that corresponds to the outer peripheral surface of the rotor at an end surface opposed to the rotor. The supports are formed from a second thermoplastic material. The first and second thermoplastic materials are formed from the same type of material and have similar melting points but different hardnesses or stiffnesses.

DETAILED DESCRIPTION OF THE PREFERRED EMBODIMENT

Figure 1:
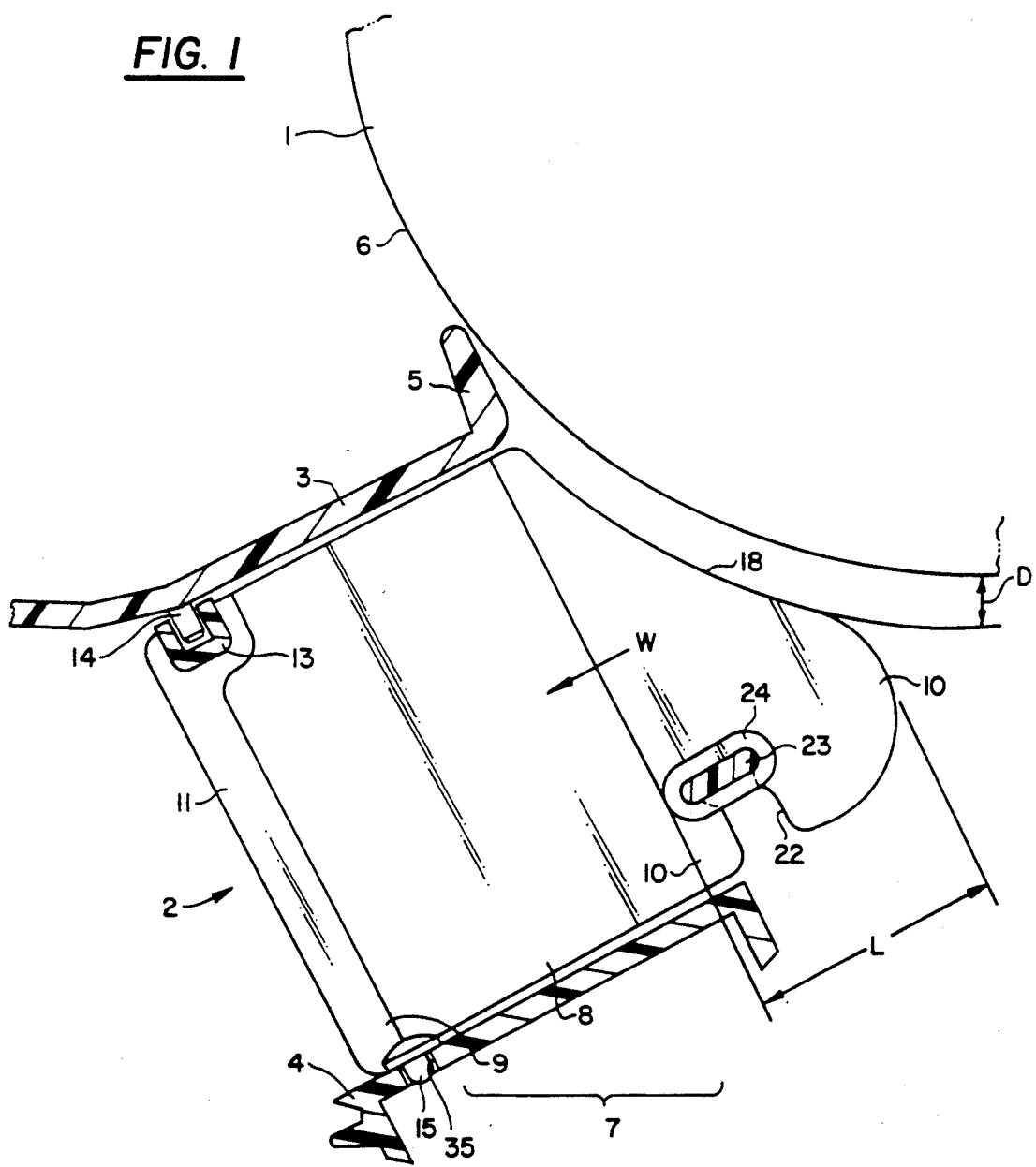
FIG. 1 is a schematic cross sectional view illustrating where an air conditioning grille in accordance with the present invention is positioned with respect to a blower rotor.

A preferred embodiment of the present invention will now be described referring to the accompanying drawings. As shown in FIG. 1, a household air conditioner is provided with a long cylindrical blower rotor 1, extending in the horizontal direction (direction normal to the surface of the sheet of FIG. 1). The blower rotor 1 is rotated by a motor (not shown).

A base 2 of the air conditioning grille is provided in the lower front (the lower left in FIG. 1) of the blower rotor 1. The base 2 includes a top plate 3 and a bottom plate 4 which extend horizontally in parallel and tilt towards the front. The rear end of the top plate 3 is bent upward so that a bent portion 5 of the plate 3 may have its upper end set close to the outer surface 6 of the rotor 1. As the rotor I is rotated, wind W is generated, which will blow out forward through the base 2.

Multiple wind deflecting vertical plates 7 are arranged in the base 2 in the lateral direction. Each wind deflecting plate 7 comprises a bendable or flexible plate 8, and front and rear inflexible supports 9 and 10 which are attached to the front and rear ends of the wind deflecting plate 7, respectively.

Figure 2:
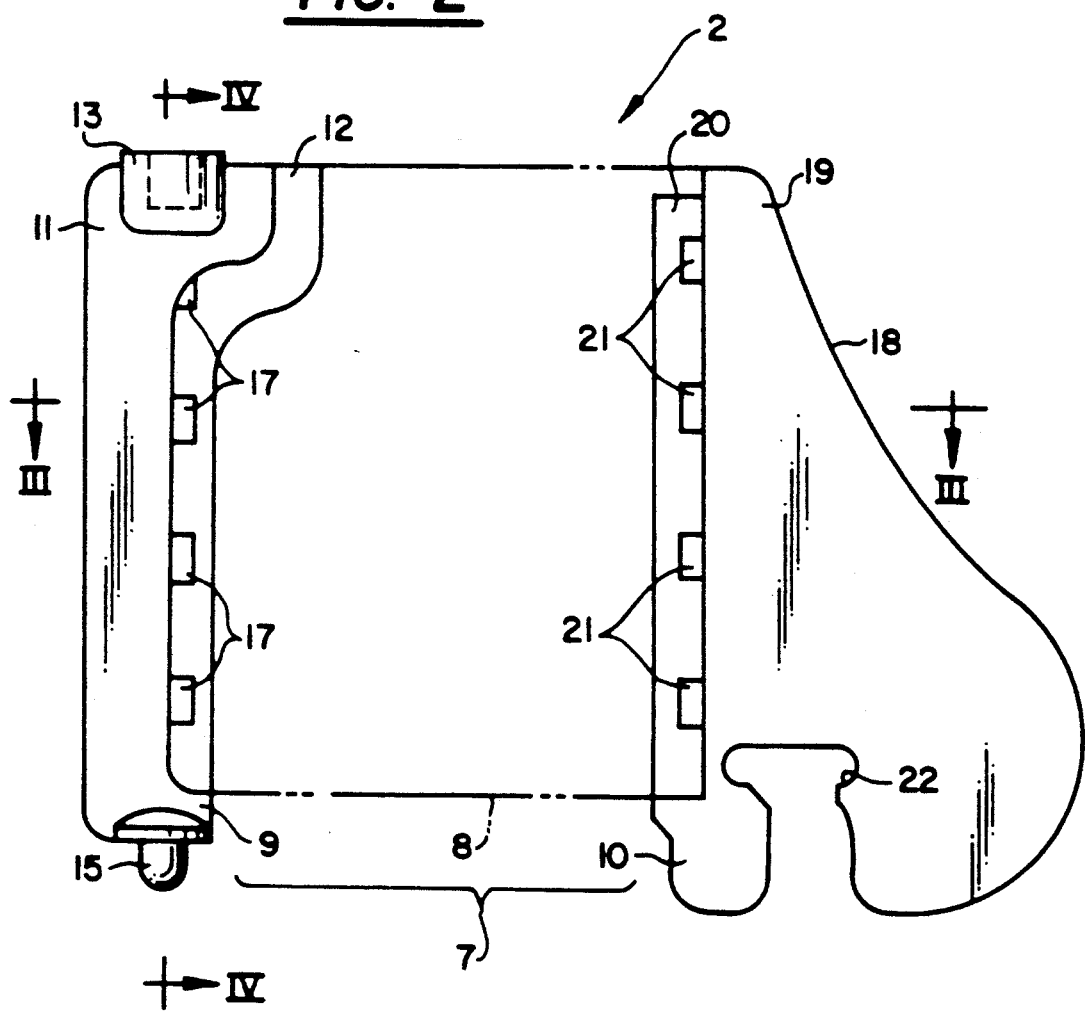
FIG. 2 is a side view illustrating front and rear supports for the wind deflecting plate.
Figure 3:
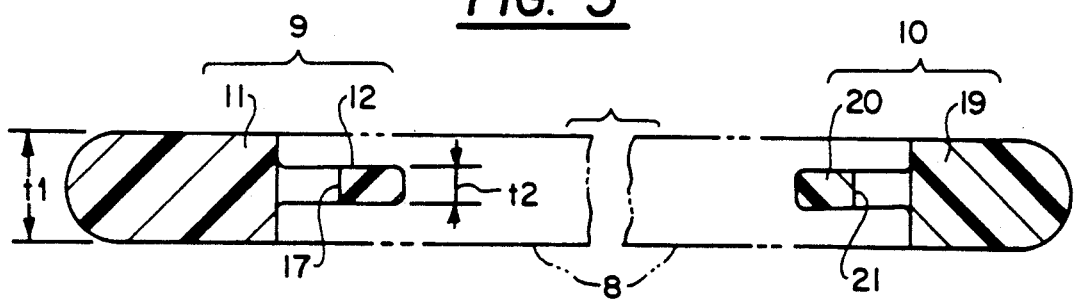
FIG. 3 is a cross sectional view taken along the line III—III in FIG. 2.
Figure 4:
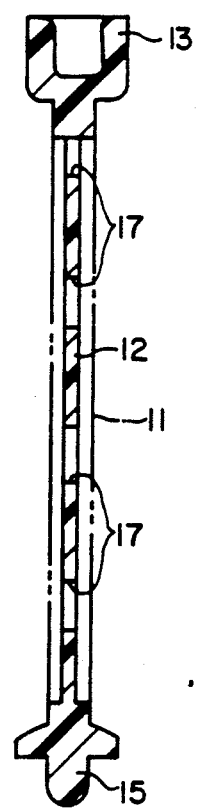
FIG. 4 is a cross sectional view taken along the line IV—IV in FIG. 2.
Figure 6:
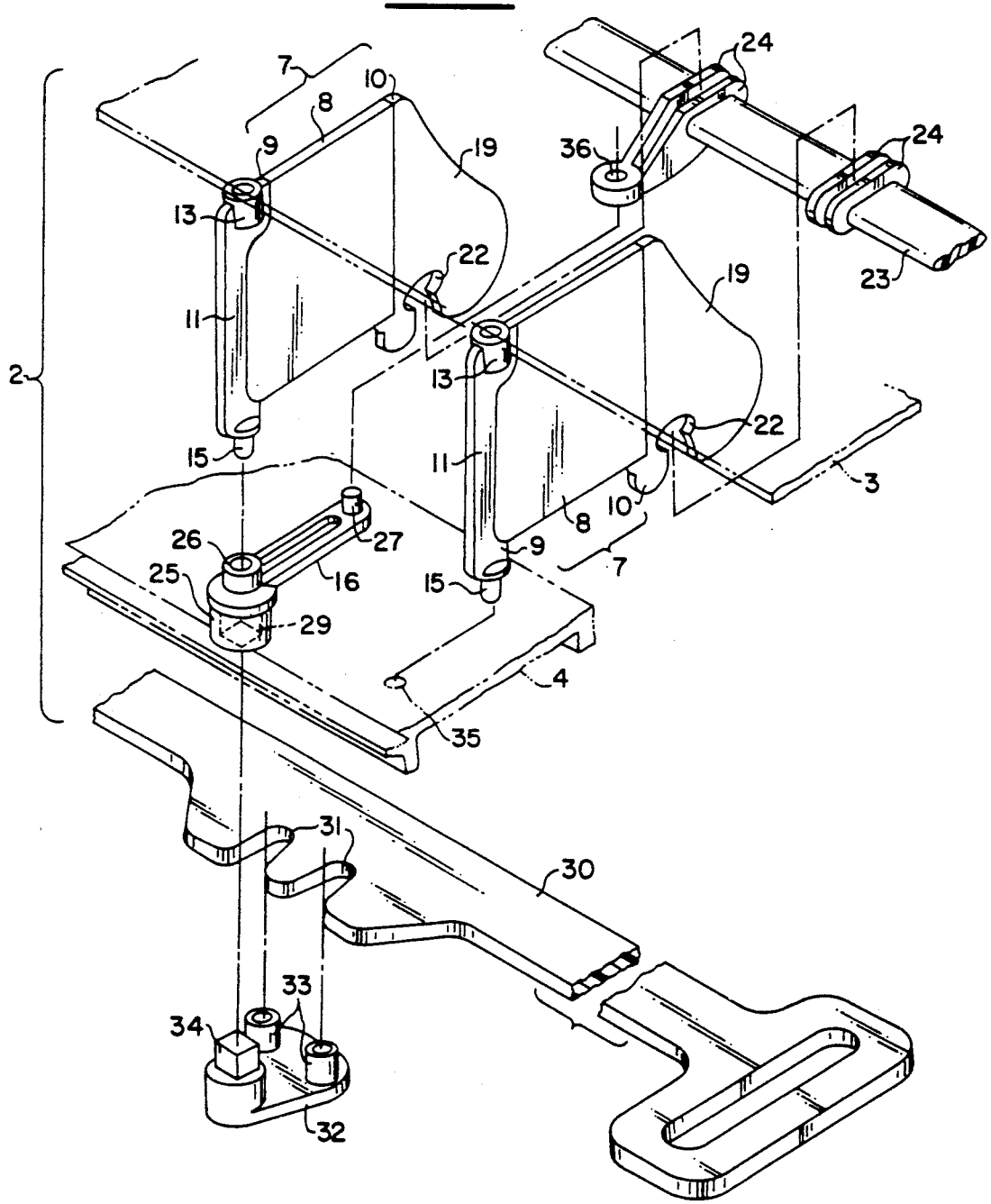
FIG. 6 is an exploded fragmentary perspective view showing the air conditioning grille.

As shown in FIG. 3, the front support 9 includes a main portion 11 having a thickness of t1, and a joint portion 12 having a thickness of t2, smaller than t1. The joint portion 12 is integrally formed with the rear side of the main portion 11. As shown in FIGS. and 4, a cylindrical shaft receiving member 13 is provided on the upper end of the main portion 11, and a shaft 14 protrusively provided on the underside of the top plate 3 of the base 2 is fitted into the member 13. A shaft 15, protruding from the lower end of the main portion 11, is supported on the bottom plate 4 directly or via a link 16 to be described later, as shown in FIG. 6. Therefore, the wind deflecting plates 7 are supported swingable with respect to the base 2 by means of the shaft receiving members 13 and the shafts 15. Multiple through holes 17 are formed in the joint portion 12 vertically apart from one another, as shown in FIG. 2.

The lower portion of the rear support 10 extends backwards to be set under the blower rotor 1, as shown in FIG. 1. A rear edge 18 of each rear support 10 is arched so as to be close to the outer surface 6 of the rotor 1 but spaced therefrom a given distance D. A length L of the rear support 10 is shortest at the top and longer towards the bottom thereof.

As shown in FIG. 3, the rear support 10 includes a main portion 19 having the same thickness (t1) as the main portion 11 of the front support 9. It also has a joint portion 20 having the same thickness (t2) as the joint portion 12 of the front support 9. The joint portion 20 is integrally formed with the front side of the main portion 19. Multiple through holes 21 are formed in the joint portion 20 vertically apart from one another. Further, as shown in FIGS. 1, 2 and 6, a cutaway portion 22 is formed in the lower portion of the main portion 19, open at the bottom edge thereof.

The flexible plate 8 has the same thickness, t1, as the main portions 11 and 19 of the respective front and rear supports 9 and 10. Partly molded into the through holes 17 and 21, the flexible plate 8 covers the joint portions 12 and 20. Both sides of the flexible plate 8, that is at the joint portions 12 and 20, are connected with each other through the through holes 17 and 20, and are flush with the sides of the main portions 11 and 19.

The flexible plate 8 and the front and rear supports 9 and 10 are fusion-bonded by heating. They are formed of materials of the same type which have similar melting points but different hardnesses or stiffnesses. The materials for the flexible plate 8 and the front and rear supports 9 and 10 may be for example a combination of soft polypropylene and hard polypropylene, soft polyvinyl chloride and hard polyvinyl chloride, soft polyurethane and hard polyurethane, or soft rubber and hard rubber. According to this embodiment, a thermoplastic elastomer ("Rubberon," a product of Mitsubishi Petrochemical Co., Ltd.) is used as the mentioned materials of the same type. The hardness (A hardness in the JIS standards) of the flexible plate 8 is set to 24, and the hardness of the front and rear supports 9 and 10 is set to 80.

Figure 5:
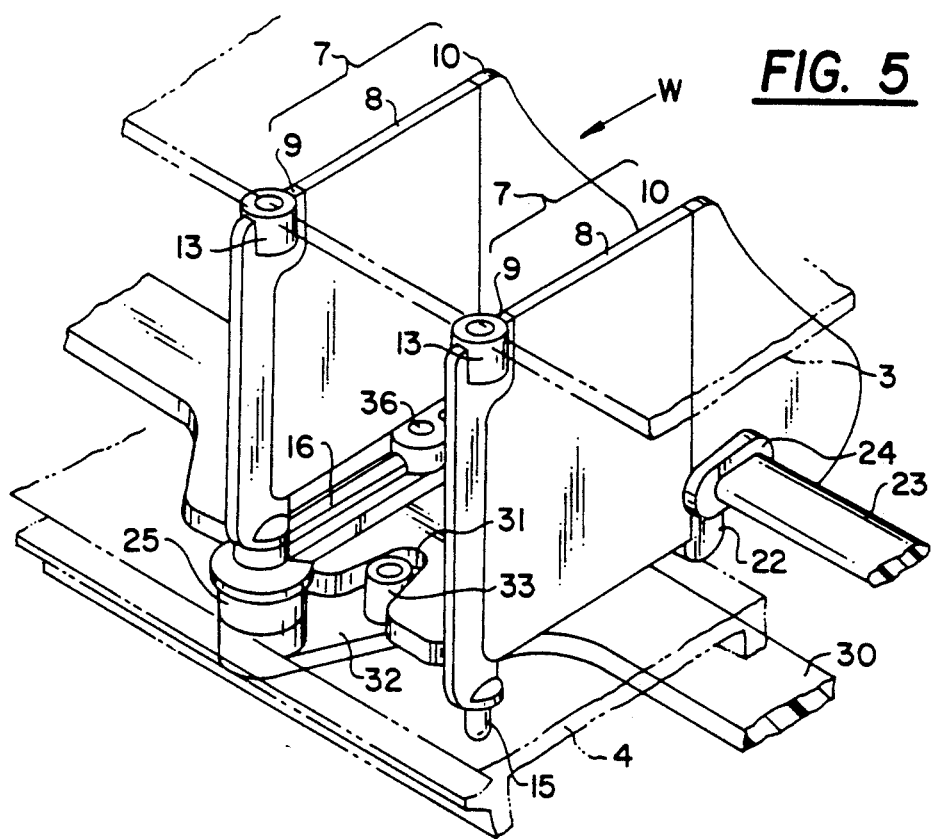
FIG. 5 is a fragmentary perspective view illustrating the air conditioning grille.
Figure 7:
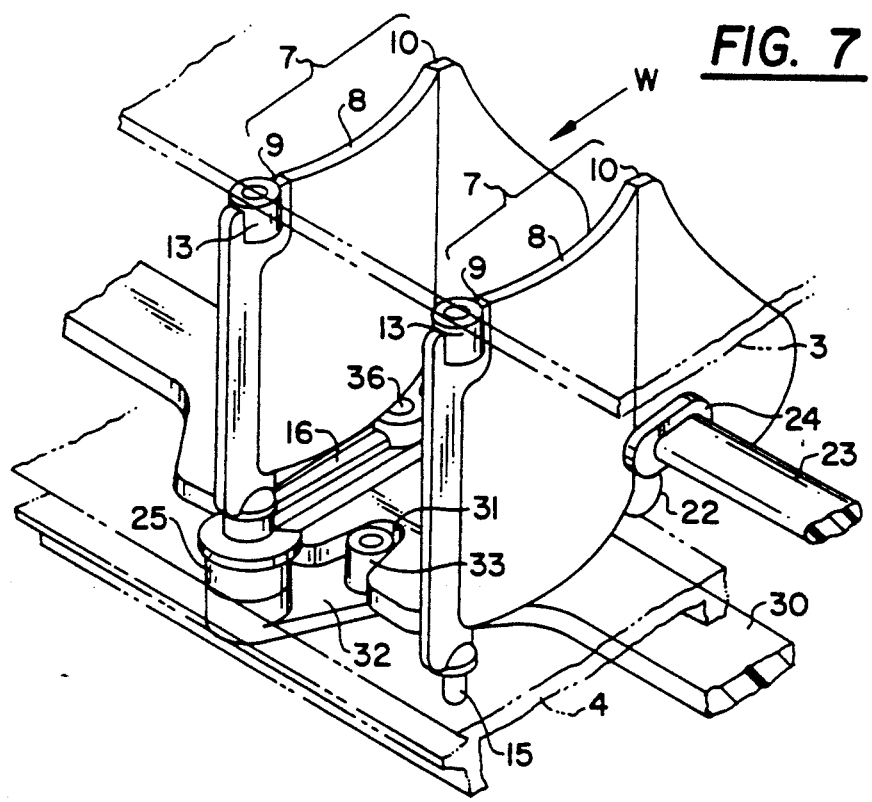
FIG. 7 is a view corresponding to FIG. 5 but showing the wind deflecting plate in a curved configuration.

As shown in FIGS. 5 and 6, the rear portions of the individual deflecting plates 7 are coupled together by a linking rod 23 extending in the horizontal direction. Pairs of flange-like clamps 24 are provided on the linking rod 23 at predetermined intervals. The peripheral portion of the cutaway portion 22 of each deflecting plate 7 is held by a clamp pair 24. The clamp pair that hold or engage link 16 project forward, and each have an annular shaft support 36 at their front ends.

The link 16 is supported on the bottom plate 4 of the base 2, pivotable on a support shaft 25. The shaft 15 of the deflecting plate 7 is inserted in a shaft support 26 atop the front end of the link 16. A projection or stub shaft 27 at the rear end of the link 16 is fitted in the shaft support 36 for the linking rod 23. A rectangular socket 29 that opens downward is formed in the support shaft 25.

A long plate-like follower rod 30, extending in the horizontal direction beneath the bottom plate 4, has a pair of notches 31 slit rearward from the front edge and adjacent to each other. A cam 32 placed under the follower rod 30 has a pair of engaging projections 33 which protrude upward through the notches 31 and abut on the underside of the bottom plate 4, supporting the plate 4. A square pole 34 is formed on the front portion of the cam 32 to be fitted in the rectangular socket 29.

Therefore, when the rod 30 is reciprocated in the horizontal direction by hand or by the motor (not shown), the cam 32 and the link 16 pivot on the support shaft 25. As the link 16 swings, the rear support 10 moves right and left through the linking rod 23. As a result, the flexible plate 8 of the wind deflecting plate 7 bends to flex in the direction opposite to the movement of the linking rod 23.

Since the flexible plate 8 curved in such a manner tends to return to the flat state by its own elasticity, great force will act on the rear support 10. In this embodiment, however, the rear portion of the rear support 10 arches along the outer surface 6 of the blower rotor 1, so that the rear end of the support 10 may be close to the blower rotor 1. In other words, the rear support 10 is designed to have the largest shape within a range in which the support 10 does not disturb the rotation of the blower rotor 1.

From the above, it is apparent that the rear support 10 for maintaining the bent state of the flexible plate 8 is designed to have the highest rigidity. The rear support 10 sturdily receives the force of the curved flexible plate 8 to return to the flat state. Thus, the wind W introduced from the back of the air conditioning grille gradually changes its direction along the bent surface of the flexible plate 8 which is kept bent by the rear support 10 and then blows out forward from the air conditioning grille.

If the length L of the rear support 10 is short, noise may be generated when the wind W passes through the grille. According to this embodiment, as described above, however, the lower portion of the rear support 10 extends to come under the lower edge of the blower rotor 1, so that the lower down along the support 10, the greater the length L becomes. The length L of the bottom end of the rear support 10 is sufficiently long to prevent noise originating from the length L.

If the shaft center of the blower rotor 1 is off even slightly, the rotor 1 may vibrate when rotating. In this embodiment, however, since the rear support 10 is spaced apart a given distance D from the outer surface 6 of the blower rotor 1, the support 10 will not contact the rotor 1.

A method for manufacturing the wind deflecting plates 7 will now be described. The wind deflecting plate 7 is made by injection-molding the front and rear supports 9 and 10 and the flexible plate 8 one after another. A molding material for the front and rear supports 9 and 10 is fused by heat and injected to fill a die cavity, thus forming the front and rear supports 9 and 10 with multiple through holes 17 and 21 formed in the joints 12 and 20, respectively.

Then, while being kept at a high temperature, the front and rear supports 9 and 10 are moved into another die, in which a molding material for the flexible plate 8 is injected to fill it up. Consequently, the fused molding material for the plate 8 flows into the through holes 17 and 21 of the respective front and rear supports 9 and 10, covering the entire joint portions 12 and 20.

The molding material for the flexible plate 8 and the molding material for the front and rear supports 9 and 10 comprise materials of the same type respectively having similar melting points but different hardnesses or thicknesses. Both materials are well compatible with each other, so that the boundary portions of the two materials may be fused and uniformly mixed to be integrally molded.

When the fused material in the die cavity is cooled to be set, the front and rear supports 9 and 10 and the flexible plate 8 are formed with their boundary portions fusion-bonded by heating, thus providing the wind deflecting plate 7 of the desirable shape.

As described above, the flexible plate 8 is partly molded into the through holes 17 and 21 of the front and rear supports 9 and 10 to be joined to the supports 9 and 10, while the front and rear end portions of the flexible plate 8 are fusion-bonded by heating to the supports 9 and 10. The flexible plate 8 and the front and rear supports 9 and 10 can be joined together with an extremely high strength in this embodiment as compared with the prior art which utilizes the mechanical coupling that involves embedding a rod member in the flexible plate, fitting part of the flexible plate in a tubular member, or joining the supports and flexible plate by means of, for example, mating engagement of recesses and projections. Thus, even if the bent direction of the wind deflecting plate 7 is repetitively changed over a long period of time, the joint portions of the flexible plate 8 and front and rear supports 9 and 10 will not be severed or peeled off.

According to this embodiment, since the front and rear supports 9 and 10 and the flexible plate 8 can be coupled together at the same time as they are formed, no adhesive is necessary. Therefore, the adhesive-applying process required in the prior art is unnecessary, resulting in reduction in a manufacturing cost accordingly.

The present invention is not limited to the embodiment described above, and may be modified in various manners within the scope and spirit of the invention. For instance, the shape of the rear support 10 may be optionally altered in accordance with the assembled relationship between the blower rotor 1 and the air conditioning grille, or the shape of the through holes 17 and 21 may be changed as needed.

What is claimed is:

1. A wind deflecting plate for an air conditioning grille vertically and swingably mounted at a downstream side of a horizontal cylindrical rotor to change the blowing direction of the wind generated by said rotor, the deflecting plate comprising:
   a flexible plate to be curved when said deflecting plate is swung for smoothly changing the blowing direction;
   a front rigid support for supporting a downstream end of said flexible plate;
   a rear rigid support supporting an upstream end of said flexible plate, said rear support having at an end surface opposed to said rotor an arcuate portion formed in a shape corresponding to the outer peripheral surface of said rotor, and
   wherein said front and rear rigid supports cooperate to maintain said flexible plate when curved.

2. A wind deflecting plate for a grille as set forth in claim 1 wherein the length of a portion of said rear support progressively increases in the downward direction.

3. A wind deflecting plate for a grille as set forth in claim 2 wherein said rear support has a rear portion protruding below said rotor.

4. A wind deflecting plate for a grille as set forth in claim 1 wherein said rear portion is arranged so that said arcuate portion is slightly spaced from the surface of the rotor.

5. A wind deflecting plate for an air conditioning grille vertically and swingably mounted at downstream side of a horizontal cylindrical rotor to change the blowing direction of the wind generated by said rotor, the deflecting plate comprising:
   a flexible plate to be curved when said deflecting plate is swung for smoothly changing the blowing direction, said flexible plate being formed of a first thermoplastic material;
   a front rigid support supporting a downstream end of said flexible plate; and
   a rear rigid support supporting an upstream side of said flexible plate, said supports being formed from a second thermoplastic material, said first and second thermoplastic materials being the same type of material and having similar melting points but different hardnesses and stiffnesses, said flexible plate being fusion-bonded to said supports.

6. A wind deflecting plate for a grille as defined in claim 5, wherein said thermoplastic materials are at least one selected from the group consisting of polypropylene, polyvinyl chloride, polyurethane, rubber and thermoplastic elastomer, and wherein the first thermoplastic material is softer than the second thermoplastic material.

7. A wind deflecting plate for an air conditioning grille vertically and swingably mounted at downstream side of a horizontal cylindrical rotor to change the blowing direction of the wind generated by said rotor, the deflecting plate comprising:

a flexible plate to be curved when said deflecting plate is swung for smoothly changing the blowing direction, said flexible plate being formed of a first thermoplastic material;

a front rigid support supporting a downstream end of said flexible plate; and a rear rigid support supporting an upstream side of said flexible plate, said supports being formed from a second thermoplastic material, said first and second thermoplastic materials being the same type of material and having similar melting points but different hardnesses and stiffnesses, each support having a main portion and a thin portion extending toward the other support, said thin portions being covered by side surfaces of said flexible plate which are flush with side surfaces of said supports.

8. A wind deflecting plate for a grille as set forth in claim 7 wherein each thin portion has a hole therethrough in which a part of said flexible plate is molded.

9. A wind deflecting plate for a grille as set forth in claim 8 wherein said supports and flexible plate are integrally formed by injection molding.

10. A wind deflecting plate for a grille vertically and swingably mounted at downstream side of a horizontal cylindrical rotor to change the blowing direction of the wind generated by said rotor, the deflecting plate comprising:

a flexible plate to be curved when said deflecting plate is swung for smoothly changing the blowing direction of the wind, said flexible plate being formed from a first thermoplastic material;

a front rigid support supporting a downstream end of said flexible plate;

a rear rigid support supporting an upstream end of said flexible plate, said rear support having at an end surface opposed to said rotor an arcuate portion formed in a shape corresponding to the outer peripheral surface of said rotor, and wherein said supports are formed from a second thermoplastic material, said first and second thermoplastic materials being the same type of material and having similar melting points but different hardnesses and stiffnesses.

11. A wind deflecting plate for a grille as set forth in claim 10 wherein said rear support increases in length as it extends lower for maintaining the arcuate portion slightly spaced from the outer peripheral surface of the rotor and has a rear portion protruding below said rotor.

12. A wind deflecting plate for a grille as set forth in claim 10 wherein each support has a main portion and a thin portion extending toward the other support, said thin portion having at least a hole therein in which a part of the flexible plate is molded and being covered by side surfaces of said flexible plate which are flush with side surfaces of the supports.

13. A wind deflecting plate for a grille as set forth in claim 12 wherein the supports and the flexible plate are formed by injection molding.

* * * * *